Figure 1:
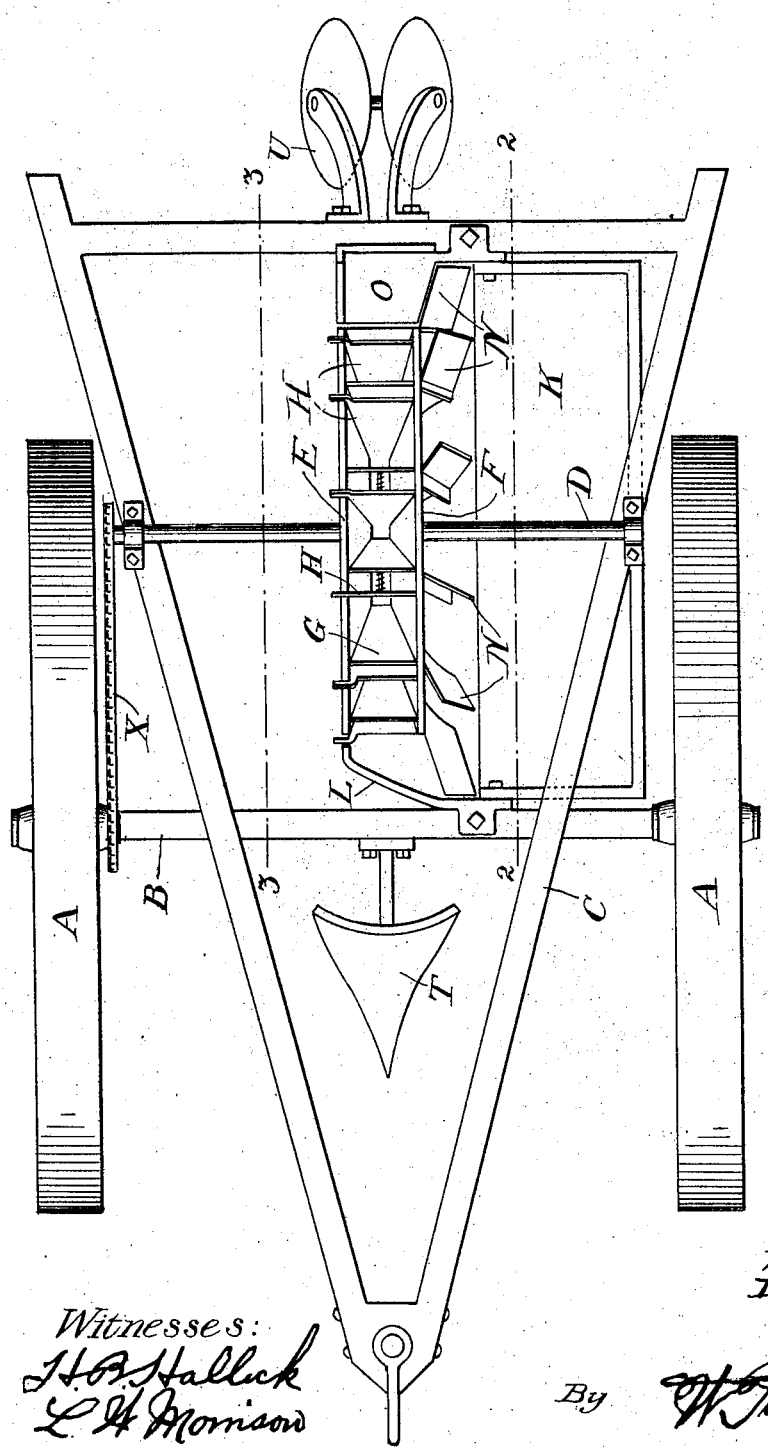

No. 760,802. PATENTED MAY 24, 1904.
W. J. NORRIS & L. W. WALTON.
POTATO PLANTER.
APPLICATION FILED JULY 6, 1903.
NO MODEL. 4 SHEETS—SHEET 1.

Witnesses:
J. H. Hallick
L. H. Morrison

William J. Norris
Louis W. Walton
Inventors

By _____ Atty.

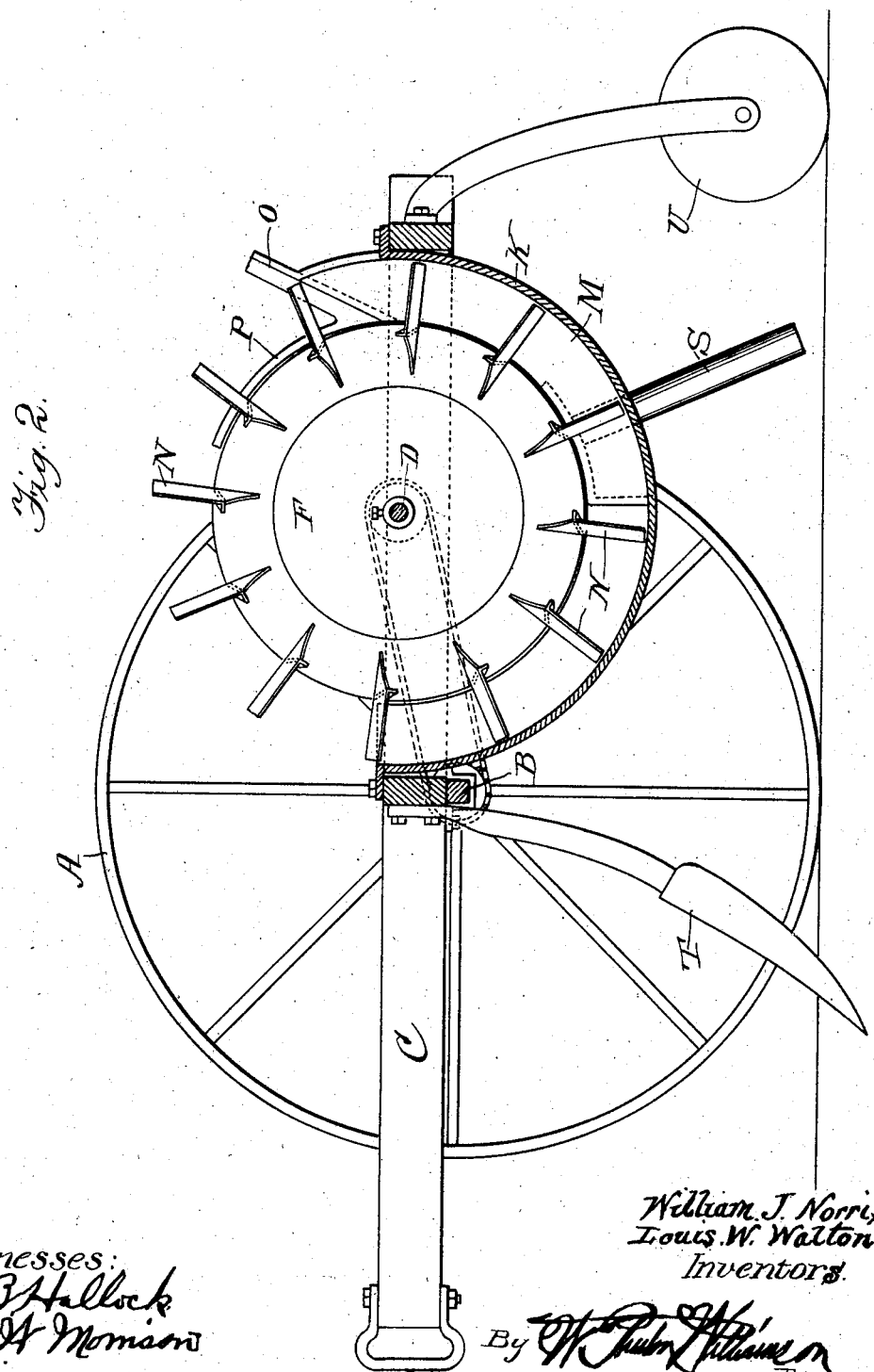

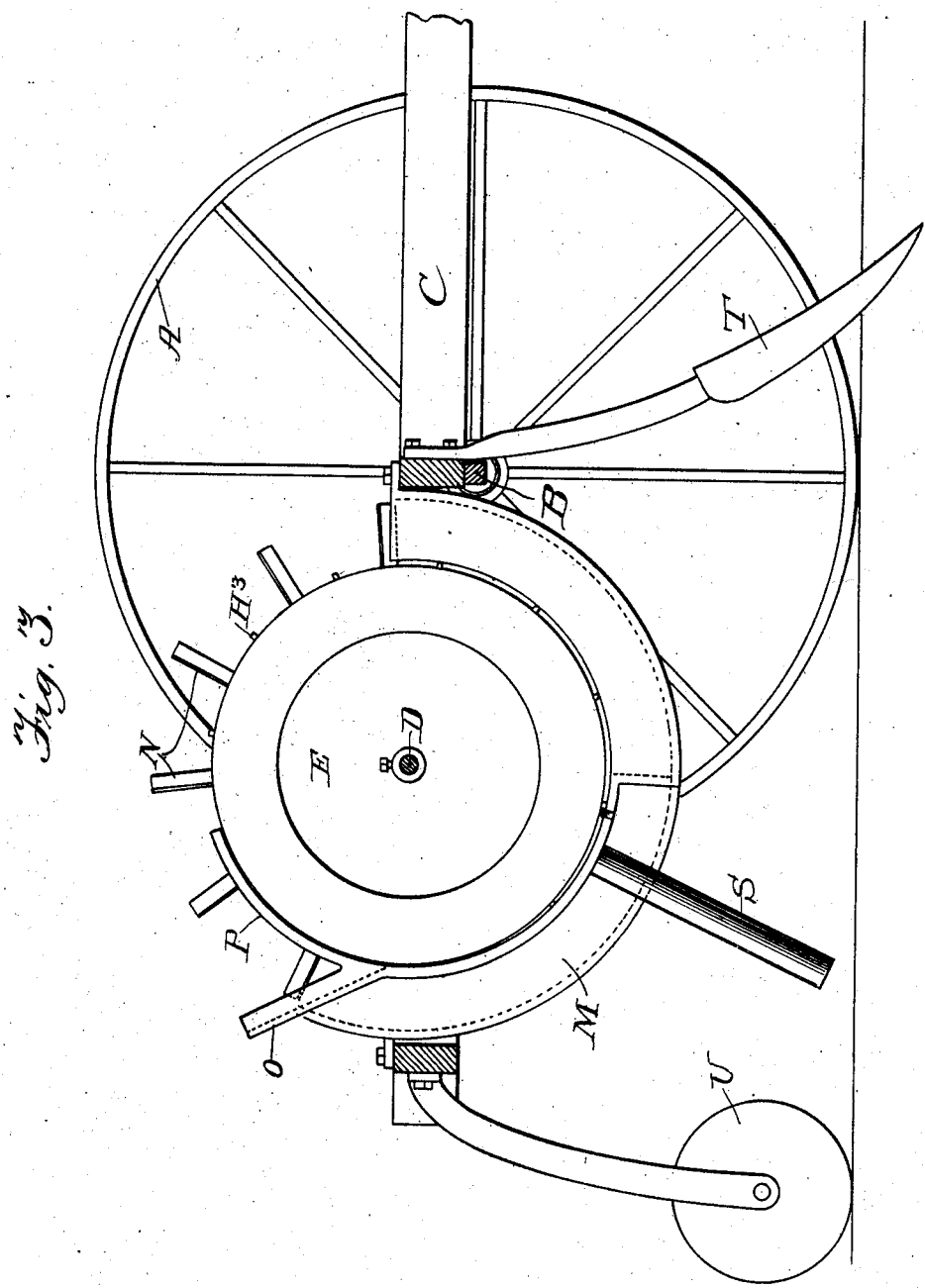

No. 760,802. PATENTED MAY 24, 1904.
W. J. NORRIS & L. W. WALTON.
POTATO PLANTER.
APPLICATION FILED JULY 6, 1903.
NO MODEL. 4 SHEETS—SHEET 4.
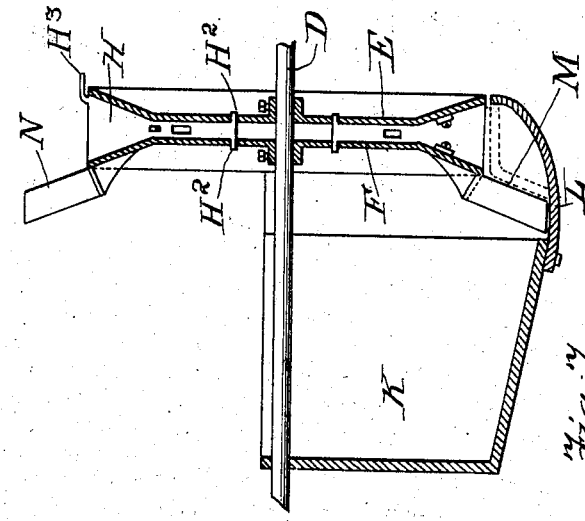
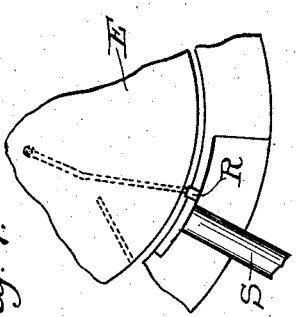
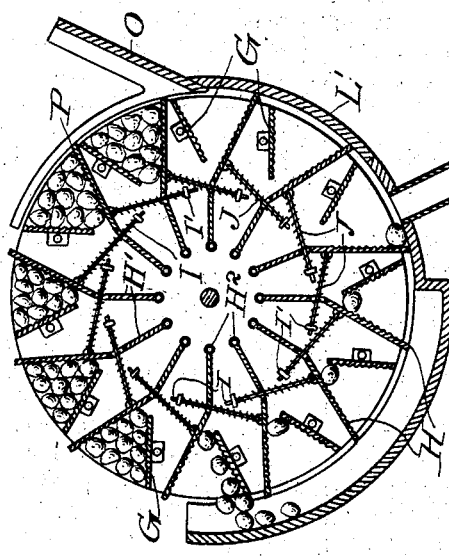
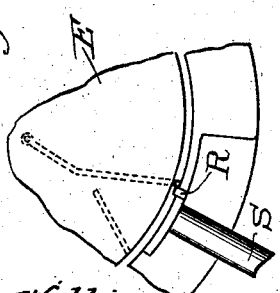
Witnesses:
William J. Norris
Louis W. Walton
Inventors
By
Atty.

No. 760,802. Patented May 24, 1904.

UNITED STATES PATENT OFFICE.

WILLIAM J. NORRIS, OF RIVERTON, NEW JERSEY, AND LOUIS W. WALTON, OF PHILADELPHIA, PENNSYLVANIA.

POTATO-PLANTER.

SPECIFICATION forming part of Letters Patent No. 760,802, dated May 24, 1904.

Application filed July 6, 1903. Serial No. 164,319. (No model.)

*To all whom it may concern:*

Be it known that we, WILLIAM J. NORRIS, residing at Riverton, county of Burlington, and State of New Jersey, and LOUIS W. WALTON, residing at Philadelphia, county of Philadelphia, and State of Pennsylvania, citizens of the United States, have invented a certain new and useful Improvement in Potato-Planters, of which the following is a specification.

Our invention relates to a new and useful improvement in potato-planters, and has for its object to provide a potato-planter in which the feeding mechanism which delivers or feeds the pieces of potato to be planted to the delivery-tube is positive and accurate in its operation and the mechanism, while being extremely efficient and durable, is simple in construction.

With these ends ends in view this invention consists in the details of construction and combination of elements hereinafter set forth and then specifically designated by the claims.

In order that those skilled in the art to which this invention appertains may understand how to make and use the same, the construction and operation will now be described in detail, referring to the accompanying drawings, forming part of this specification, in which—

Figure 1 is a plan view of the machine; Fig. 2, a longitudinal section on the line 2 2 of Fig. 1; Fig. 3, a section on the line 3 3 of Fig. 1; Fig. 4, a longitudinal section through the pockets of the feeding mechanism; Fig. 5, a cross-section through the rotary feeding mechanism and hopper; Fig. 6, a detail view showing the means for opening one of the pockets to deliver a potato to the delivery-chute; Fig. 7, a similar view to Fig. 6, showing the pocket opened.

The general disadvantage of potato-planters is that every once in a while the machine will skip and not feed a piece of potato as desired and sometimes two or three pieces will be fed in the same hill. Our improved machine is designed to overcome this disadvantage, and our improvement relates only to the feeding and delivery mechanism. The balance of the machine may be made in any manner desired.

A represents the traction-wheels.

B is the main axle.

C is the frame supported on the main axle, and this frame may be made in any manner desired.

D is a counter-shaft journaled on the framework at the rear of the main axle, and secured on this shaft D are two disks E and F, each disk being a counterpart of one another and being flared out annularly around their outer edge, the center portion of each disk being vertical and parallel with one another and being located a slight distance apart.

G represents triangular partitions secured to each disk between the same and lying wholly within the flared-out portion of the disk. These partitions are secured at regular intervals around the disk and form one wall of a series of pockets, and the other walls of the pockets are formed by the movable partitions H. The upper ends of these movable partitions are triangular in shape, the same as the fixed walls, and extending downward from this triangular portion of the movable partitions in between the disks are shanks H', and the lower ends of these shanks are pivoted to the disks by means of studs $H^2$, which extend out from each side of the shanks into holes formed through the disks. Secured to the back of each of the movable partitions H are rods I, the other ends of said rods passing through holes formed through ears I', formed with one of the disks.

J represents springs coiled about the rod I and interposed between the rear of the movable partitions H and the ears I', so as to always tend to move the movable partitions of each pocket toward the stationary partition. In order to allow for sufficient elasticity in the spring, we form through each of the shanks of the movable walls H an opening, through which the rod I and spring J of the next partition in front may extend; but of course, if found desirable, the rod I could be shortened and would not need to extend through the next movable partition, as shown in the drawings.

K is a hopper supported by the framework and arranged alongside of the disks. This hopper is adapted to contain the pieces of potato to be planted and is so shaped that the potatoes will tend to fall or roll toward the disks.

L is a casting surrounding the disks upon their lower side, and this casting is so formed upon the forward side that it communicates with the hopper and inclines toward the same, as shown in Fig. 1; but at the rear of the center the casting extends close to the periphery of the disks and is provided with a wall in alinement with the disk F, as shown at M in Figs. 3 and 5.

Secured to the outside of the disk F is a series of wings N, arranged at regular intervals and numbering the same as the pockets. These wings N extend beyond the periphery of the disks, as shown in Figs. 3 and 5, and are arranged at such an angle that as they rotate within the hopper each wing will pick up a number of pieces of potato, and as these wings rotate in close contact with the wall M these potatoes will be elevated to a point above the wall M, and as these wings are inclined downward toward the disk, to which they are secured after they have reached a point above the wall M, the attachment will roll off upon an incline plate O, which inclines downward toward the disks, and these pieces of potato therefore will be deposited in the pockets between the disks.

Each of the movable partitions or walls H is provided with a lug $H^3$, which extends beyond the periphery of the disk E, and these lugs $H^3$ are designed to come in contact with a cam-surface P just before the inclined plate O is reached, and therefore the movable partitions or walls H will be moved a slight distance away from the stationary partitions or walls, and the pocket will be widened correspondingly as it receives the potatoes, and as the disks continue to revolve the lugs $H^3$ will run from underneath the cam P at a point near the vertical center, and then the springs J will act to close the movable partition upon the potatoes, and as the movable and stationary partition of each pocket is inclined at an opposite angle to one another, so that the narrowest point is toward the center of the disks, the piece of potato that is nearest the center of the disks will be clamped between the movable and stationary walls, and as the inner face of both the movable and stationary walls are corrugated laterally only the bottom piece of potato will be held, the other pieces being loose within the pocket, and as the disks continue to revolve the loose potatoes will fall out into that portion of the casting L which communicates with the hopper, and as that portion of the casting communicating with the hopper inclines toward the hopper the potatoes will roll in position to be again taken up by other wings and deposited in other pockets; but the bottommost potato will be held between the walls of the pockets until the pocket is above that portion L' of the casting L which extends close to the periphery of the disks. Then the lug $H^3$ will strike a projection R, formed with the casting L, as shown in Figs. 6 and 7, and the pocket will be momentarily opened while it is passing this projection, so that the piece of potato held in the pocket will be allowed to fall upon the curved surface L' of the casting, and this piece of potato will then be scraped along the wall L' by the movable partition until it is opposite the delivery-chute S, which extends through the wall L', and the piece of potato will then drop down the chute into the furrow which has been opened by the plow-point T, located at the forward end of the machine.

Any suitable device could be used to cover over the potatoes after they have been planted, and we have shown in the drawings two disks secured to the rear of the machine, as indicated at U.

The shaft D may be driven from the main axle in any suitable manner, here shown as by means of the chain X.

We do not wish to be limited to any specific construction, as we wish to claim, broadly, the idea of elevating a number of pieces of potato and depositing them in pockets and in clamping one piece of potato in a pocket and allowing the surplus to fall therefrom into the hopper and then releasing the one piece of potato at the proper time for planting. Therefore we do not wish to be limited to the exact construction here shown, as slight modifications could be made without departing from the spirit of our invention.

Having thus fully described our invention, what we claim as new and useful is—

1. In a potato-planter, a pair of traction-wheels, a main axle, a framework supported on the main axle, a hopper supported by the framework, an elevating mechanism, a series of rotating pockets, the elevating mechanism adapted to pick up the potatoes from the hopper and deposit them within the pockets, each of said pockets being composed of a stationary and a movable wall inclined toward one another, means for moving the movable wall away from the stationary wall of each pocket when the potatoes are deposited in the same, springs for forcing the movable wall toward the stationary wall at the proper time to clamp the bottommost piece of potato in the pocket, the surplus potatoes in the pocket adapted to be deposited again in the hopper as the pockets revolve, and means for releasing each piece of potato clamped in the pockets and allowing the same to fall down the delivery-chute, as and for the purpose specified.

2. In a potato-planter, a pair of traction-wheels, a main axle, a suitable framework supported upon the main axle, a transverse shaft journaled upon the framework at the rear of the axle and adapted to be driven from the traction-wheels, a pair of disks secured to the shaft at a slight distance apart, a hopper secured to the framework at one side of the disks, stationary partitions secured between the disks at their peripheries, movable partitions located between the disks and arranged at an opposite angle to the stationary partitions, the movable and stationary partition forming a pocket, springs adapted to normally press the movable partition toward the stationary partition, elevating mechanism adapted to pick up the potatoes in the hopper and deposit them in the pockets between the disks, means for moving the movable partition of each pocket away from the stationary partition as the potatoes are deposited therein, the springs adapted to force the movable partition toward the stationary partition and clamp the bottommost piece of potato between the partitions, the surplus potatoes in the pockets adapted to be deposited in the hopper again as the disks revolve, a delivery-chute, means for pressing the movable partition away from the stationary partition of each pocket at the proper time to release the piece of potato clamped between the partitions and allow the same to fall into the delivery-chute, as and for the purpose specified.

3. In a potato-planter, a pair of driving-wheels, a main axle upon which said wheels are journaled, a suitable framework supported by the main axle, a transverse shaft at the rear of the main axle journaled to the framework, means for revolving said shaft from the driving-wheels, two disks secured to said shaft at a slight distance apart, the outer edges of said disks being flared outward annularly at an opposite angle to one another, triangular partitions secured between the flared-out portions of the disks at regular intervals around the disks, movable partitions, one arranged in juxtaposition to each stationary partition, each stationary and movable partition being inclined toward one another and toward the center of the disks, thereby forming a pocket with the smallest end toward the shaft, springs tending to press the movable partition toward the stationary partition, a hopper arranged at one side of the disks, the bottom of the same inclined toward the disks, a series of paddles secured upon the outside of the disk next to the hopper and revolving within the hopper, a casting surrounding the lower half of the disks, the forward portion of the casting extending from the outermost disk and communicating with the hopper, the rearward portion of the casting from the vertical line curving around close to the periphery of the disks and concentric therewith, a wall formed with this curved portion of the casting in alinement with the disk to which the paddles are secured, said paddles adapted to revolve in close contact with said wall and adapted to pick up the potatoes from the hopper and leave them along the wall, an inclined plate inclined downward toward the disks located at the upper end of said wall upon which the potatoes are adapted to be deposited by the paddles and roll down the plate into the pockets between the disks, means for moving the movable partitions away from the stationary partitions as each pocket reaches the point just below the inclined plate so that the pocket will be opened when the potatoes are deposited therein, the springs adapted to close the pockets and clamp the bottommost potato between the walls, the inner face of the partitions being corrugated so as to leave all of the potatoes except the bottom one loose which are adapted to fall out of the pockets into the forward portion of the casting, and from there into the hopper as the disks revolve, means for opening the pockets and releasing the clamped piece of potato as each pocket comes above the rearward-curved wall of the casting, a delivery-chute extending from the curved casting downward into which the piece of potato is adapted to drop when released from the pockets, as specified.

4. In a potato-planter, a pair of driving-wheels, a main axle, a suitable framework supported upon the main axle, a revolving member journaled in the framework and adapted to be driven from the driving-wheel, a series of pockets formed in the revolving member, a hopper, means for elevating and depositing a number of pieces of potato in each pocket, means for clamping one piece of potato of the number deposited in each pocket and allowing the surplus pieces to fall back into the hopper as the member revolves, and means for releasing the piece of potato clamped in each pocket at the proper time, as and for the purpose specified.

In testimony whereof we have hereunto affixed our signatures in the presence of two subscribing witnesses.

WILLIAM J. NORRIS.
LOUIS W. WALTON.

Witnesses:
 LEWIS B. FIFE,
 MARGARET C. WALTON.